United States Patent
Sensui

(10) Patent No.: US 6,327,098 B1
(45) Date of Patent: Dec. 4, 2001

(54) WIDE-ANGLE ZOOM LENS SYSTEM

(75) Inventor: Takayuki Sensui, Tokyo (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/427,189

(22) Filed: Oct. 26, 1999

(30) Foreign Application Priority Data

Oct. 26, 1998 (JP) .................................................. 10-304416

(51) Int. Cl.$^7$ ................................................... G02B 15/14
(52) U.S. Cl. .......................... 359/680; 359/681; 359/685; 359/689
(58) Field of Search .................................. 359/680, 681, 359/682, 685, 689, 690, 708, 739, 740

(56) References Cited

U.S. PATENT DOCUMENTS

| | | | |
|---|---|---|---|
| 4,735,493 | 4/1988 | Tachihara | 359/691 |
| 5,329,401 | * 7/1994 | Sato | 359/686 |
| 5,724,193 | 3/1998 | Hirakawa | 359/691 |
| 5,877,901 | 3/1999 | Enomoto et al. | 359/691 |
| 6,246,529 | * 6/2001 | Sensui | 359/680 |

* cited by examiner

Primary Examiner—Georgia Epps
Assistant Examiner—David N. Spector
(74) Attorney, Agent, or Firm—Greenblum & Bernstein, P.L.C.

(57) ABSTRACT

A wide-angle zoom lens system including a negative first lens group, a positive second lens group, a diaphragm, and a positive third lens group, in this order from the object; whereby upon zooming from the short focal length extremity towards the long focal length extremity, each lens group is arranged to move so that the space between the first and second lens groups and the space between the second and third lens groups are narrowed; and the diaphragm moves integrally with the third lens group. At least one negative lens element having a concave surface facing towards the image is provided in the first lens group, and the concave surface of the at least one negative lens element is an aspherical surface; and the wide-angle zoom lens system preferably satisfies the following condition;

$$0.8 < X1/fS < 2.0 \tag{1}$$

wherein
X1 designates the distance, along the optical axis, between the aspherical surface in the first lens group and the diaphragm at the long focal length extremity; and
fS designates the focal length of the entire lens system at the short focal length extremity.

12 Claims, 14 Drawing Sheets

Fno=4

——— d line
------- g line
- - - - C line

SPHERICAL
ABERRATION

CHROMATIC
ABERRATION

W=32.6°

-0.05    0.05
LATERAL
CHROMATIC
ABERRATION

W=32.6°

—— S
-- M

-0.5    0.5
ASTIGMATISM

W=32.6°

-4  %  4
DISTORTION

Fno=4

-0.5　0.5
SPHERICAL
ABERRATION

CHROMATIC
ABERRATION

——— d line
----- g line
--- C line

W=47.8°

-0.05　0.05
LATERAL
CHROMATIC
ABERRATION

W=47.8°

-0.5　0.5
ASTIGMATISM

— S
-- M

W=47.8°

-4　%　4
DISTORTION

Fig. 7
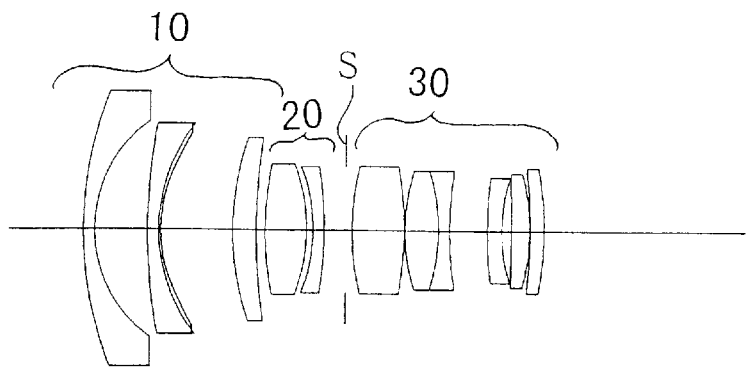
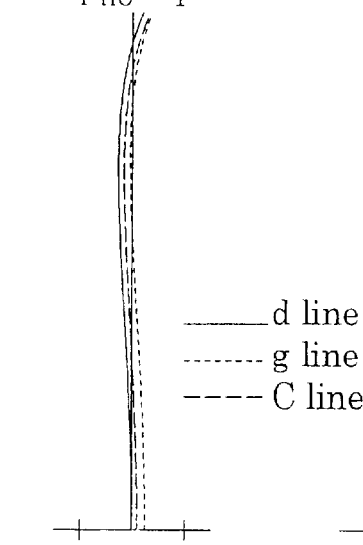
Fig. 8A
Fno=4
—— d line
······ g line
---- C line
-0.5   0.5
SPHERICAL
ABERRATION
CHROMATIC
ABERRATION
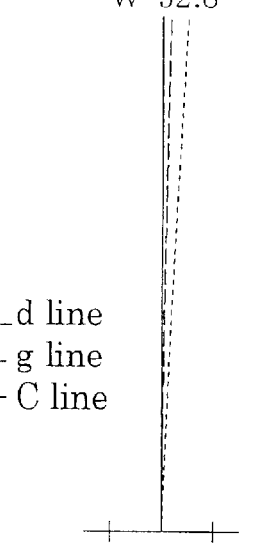
Fig. 8B
W=32.8°
-0.05  0.05
LATERAL
CHROMATIC
ABERRATION
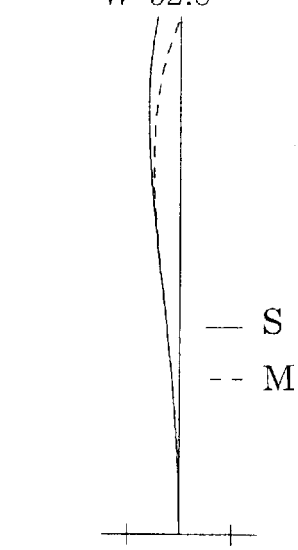
Fig. 8C
W=32.8°
—— S
-- M
-0.5   0.5
ASTIGMATISM
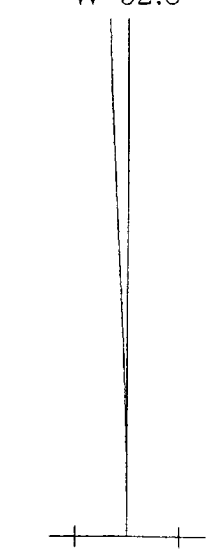
Fig. 8D
W=32.8°
-4 %  4
DISTORTION Fig. 9
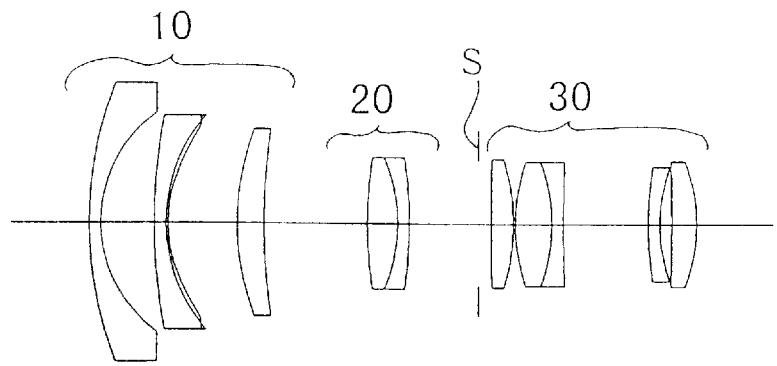
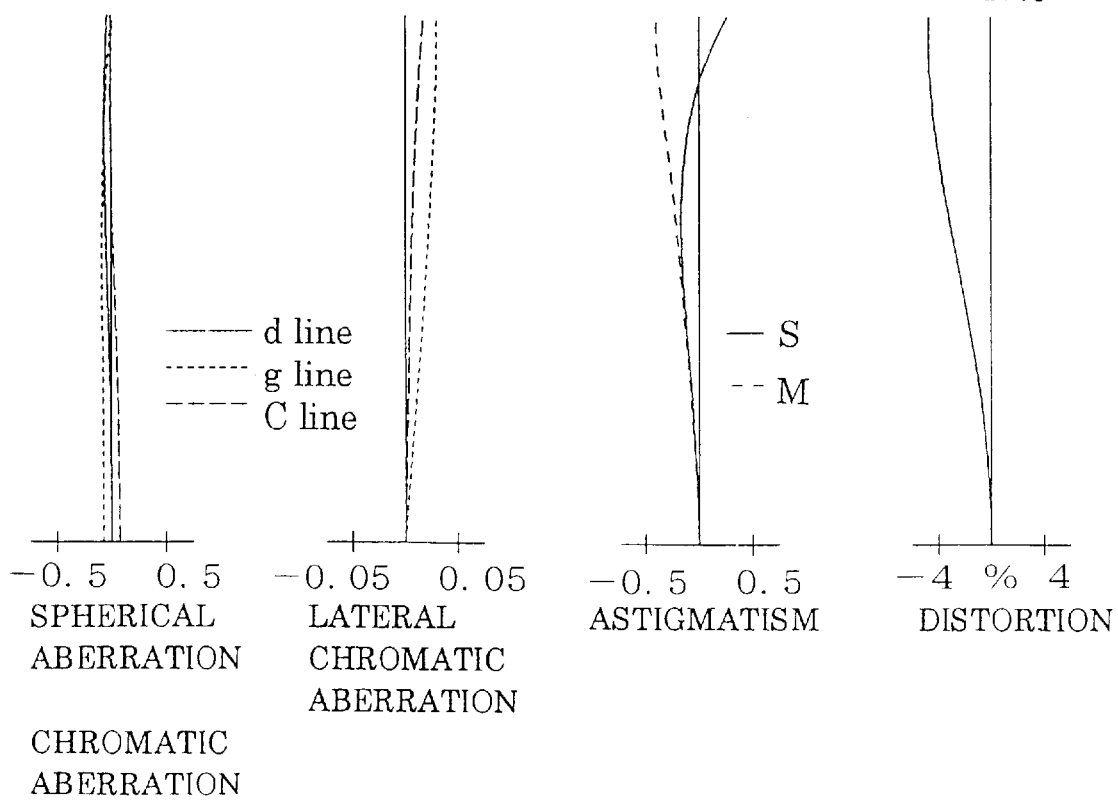
Fig. 10A  Fno=4
Fig. 10B  W=47.8°
Fig. 10C  W=47.8°
Fig. 10D  W=47.8°
— d line
--- g line
--- C line
— S
-- M
−0.5  0.5
SPHERICAL
ABERRATION
CHROMATIC
ABERRATION
−0.05  0.05
LATERAL
CHROMATIC
ABERRATION
−0.5  0.5
ASTIGMATISM
−4 %  4
DISTORTION Fig. 11
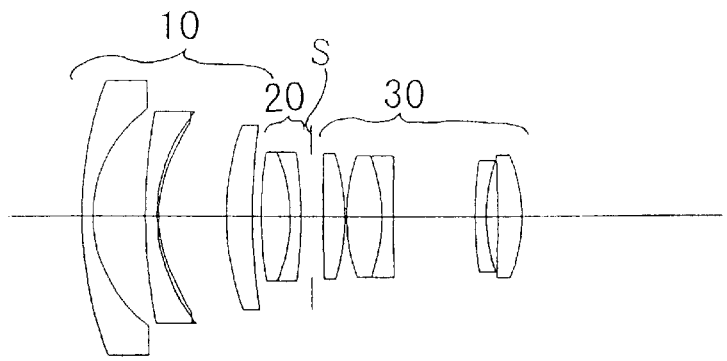
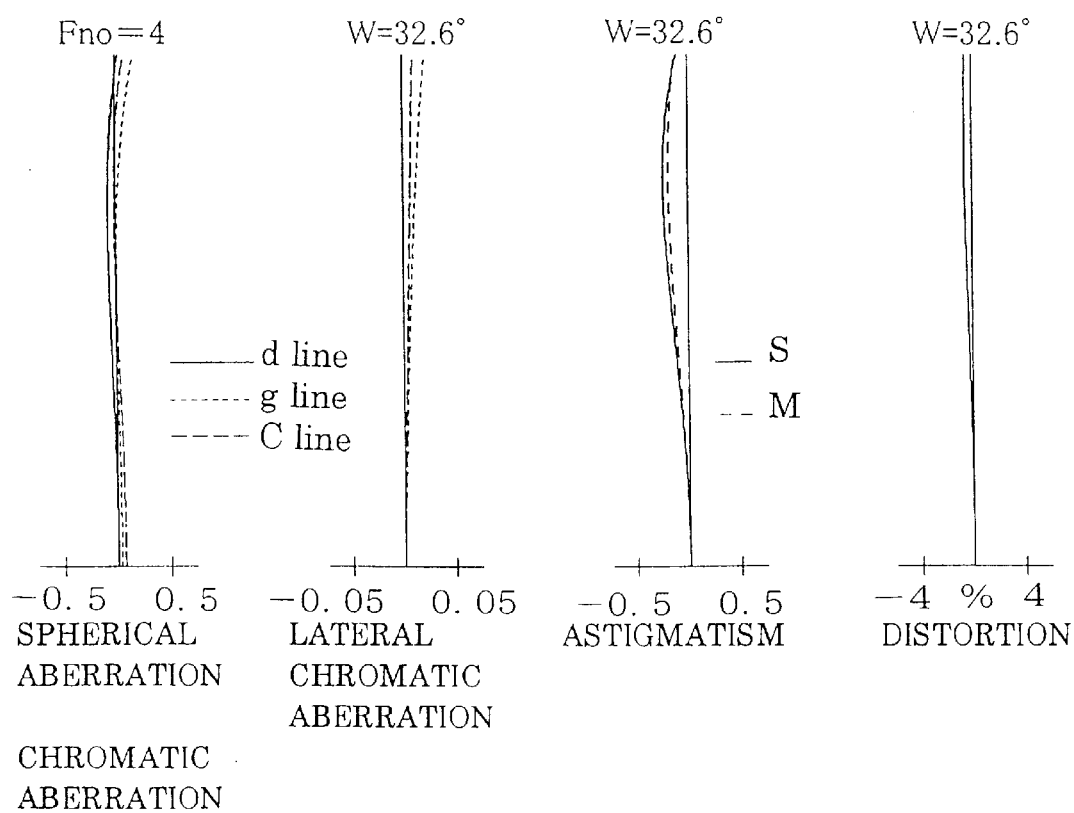
Fig. 12A  Fig. 12B  Fig. 12C  Fig. 12D Fig. 13
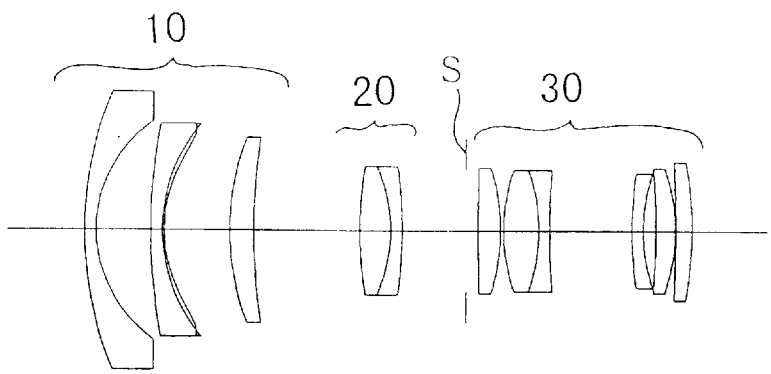
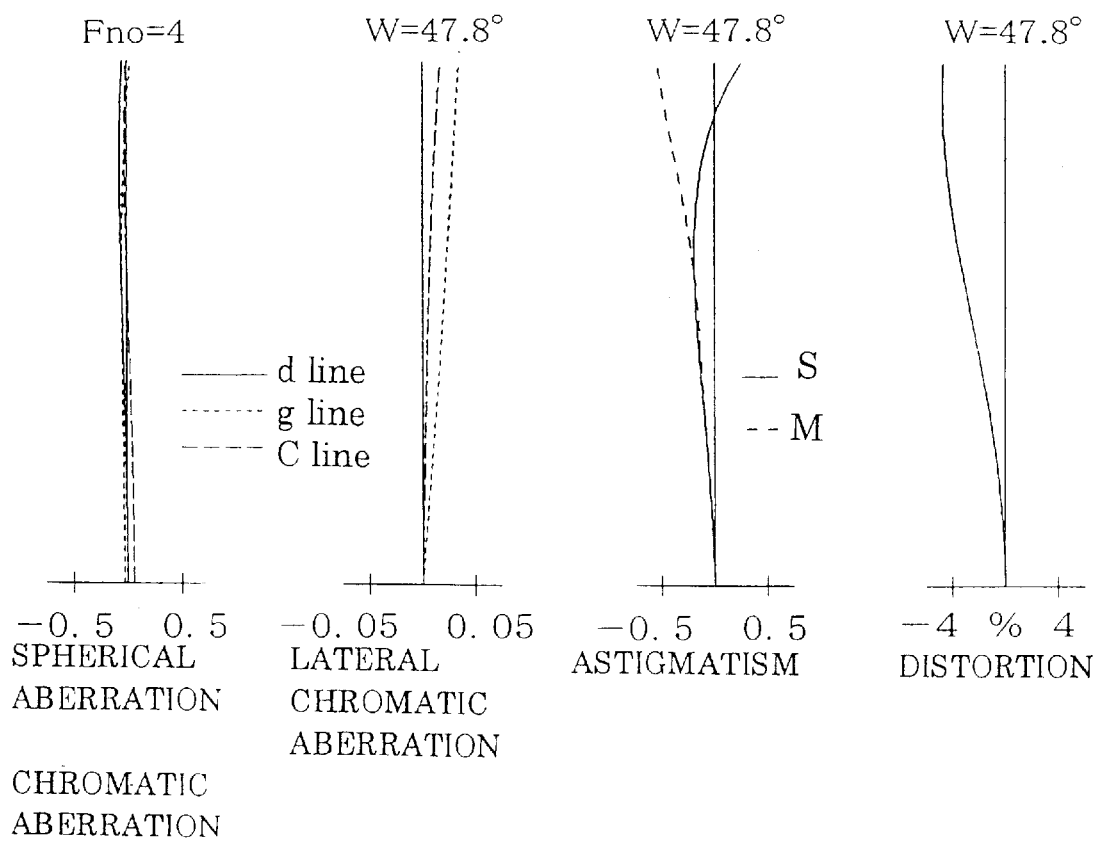
Fig. 14A  Fig. 14B  Fig. 14C  Fig. 14D Fig. 15
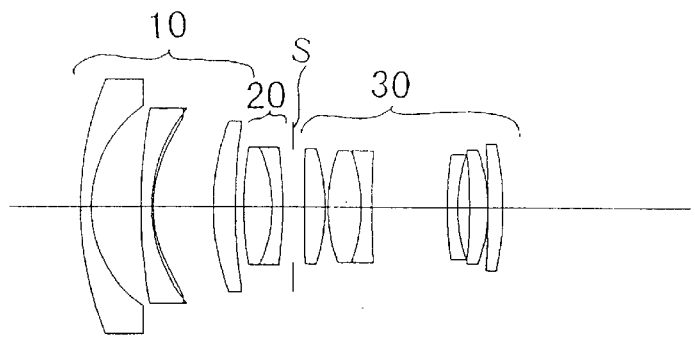
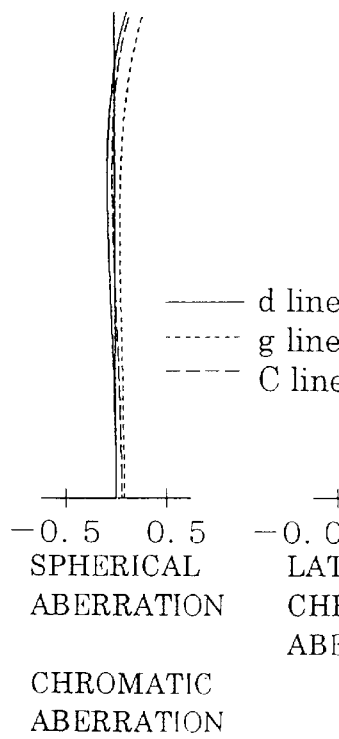
Fig. 16A
Fno=4
— d line
······· g line
--- C line
−0.5  0.5
SPHERICAL
ABERRATION
CHROMATIC
ABERRATION
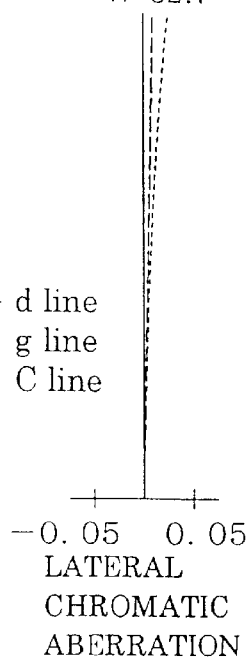
Fig. 16B
W=32.7°
−0.05  0.05
LATERAL
CHROMATIC
ABERRATION
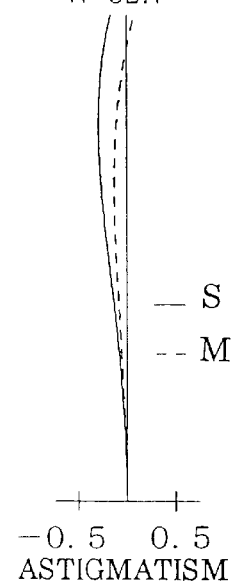
Fig. 16C
W=32.7°
— S
-- M
−0.5  0.5
ASTIGMATISM
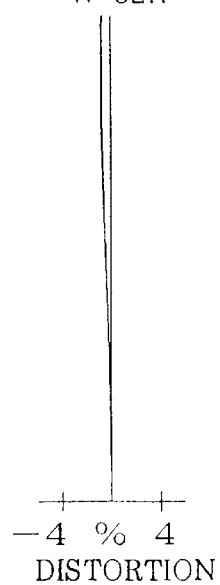
Fig. 16D
W=32.7°
−4 %  4
DISTORTION Fno=4

─── d line
----- g line
---- C line

-0.5    0.5
SPHERICAL
ABERRATION
CHROMATIC
ABERRATION

W=47.8°

-0.05   0.05
LATERAL
CHROMATIC
ABERRATION

W=47.8°

── S
-- M

-0.5   0.5
ASTIGMATISM

W=47.8°

-4 %   4
DISTORTION

Fig. 19
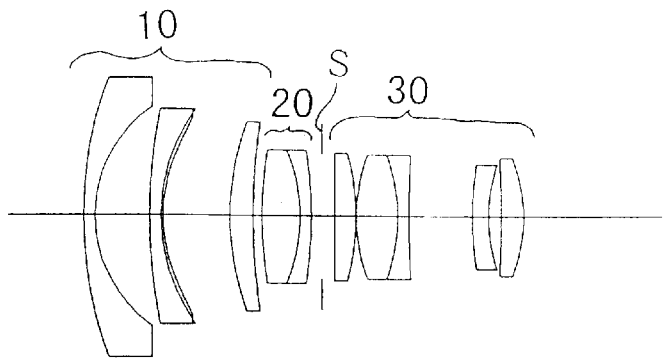
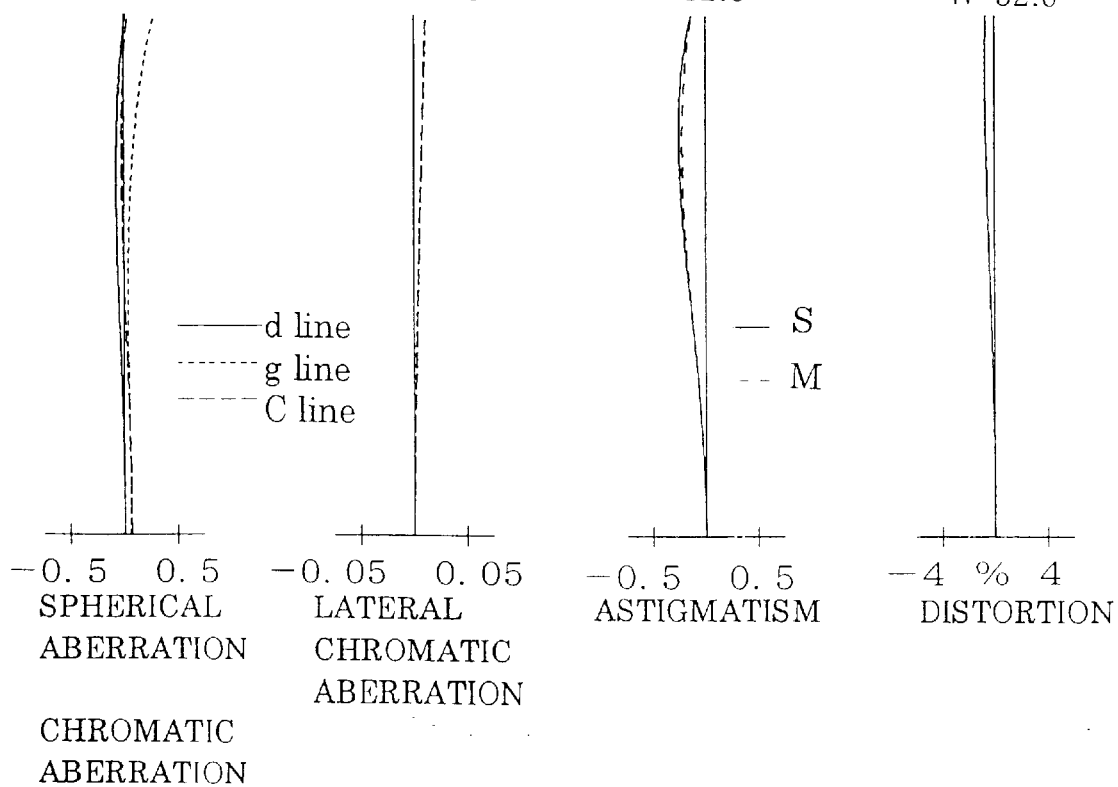
Fig. 20A
Fno=4
Fig. 20B
W=32.6°
Fig. 20C
W=32.6°
Fig. 20D
W=32.6°
—— d line
------ g line
– – C line
— S
- - M
-0.5  0.5
SPHERICAL
ABERRATION
CHROMATIC
ABERRATION
-0.05  0.05
LATERAL
CHROMATIC
ABERRATION
-0.5  0.5
ASTIGMATISM
-4 %  4
DISTORTION Fig. 21
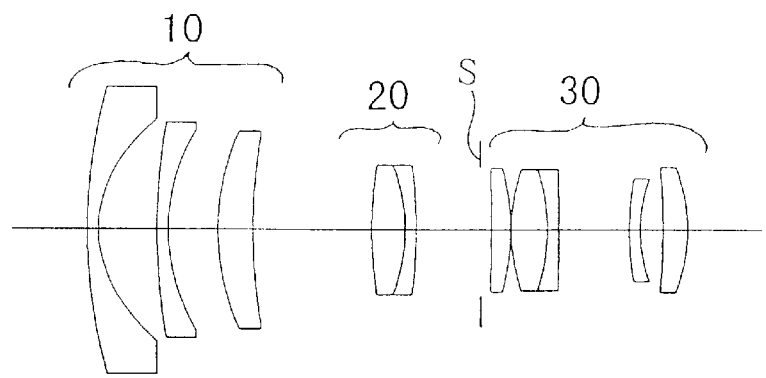
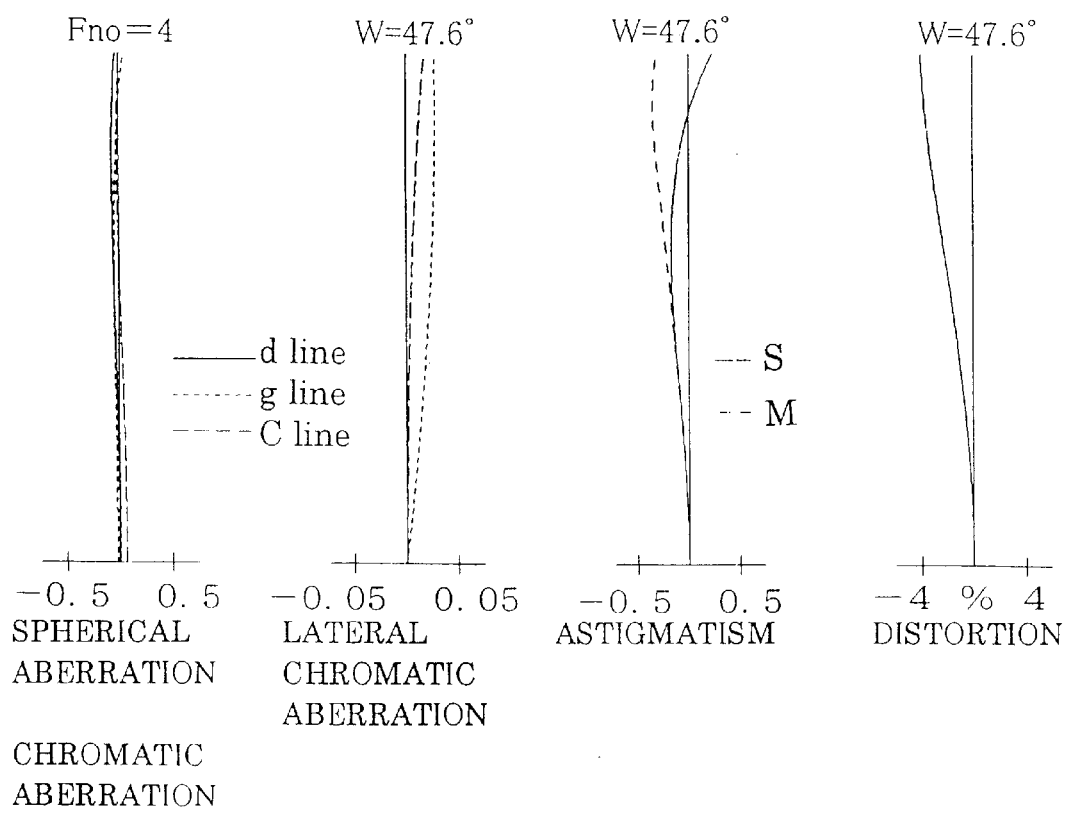
Fig. 22A  Fig. 22B  Fig. 22C  Fig. 22D Fig. 23
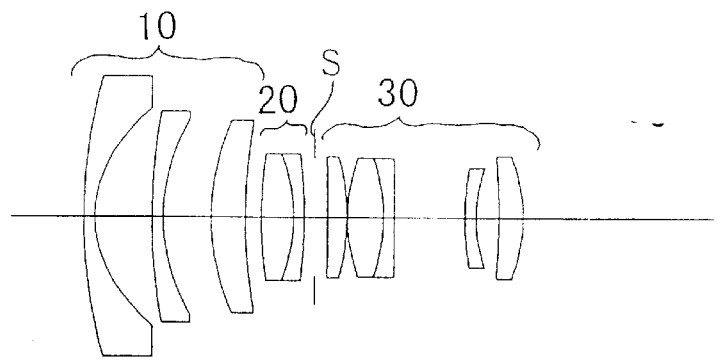
Fig. 24A    Fig. 24B    Fig. 24C    Fig. 24D
Fno=4     W=32.4°     W=32.4°     W=32.4°
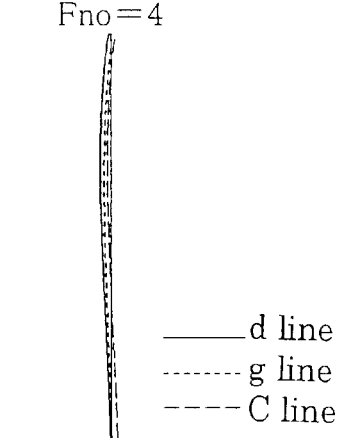
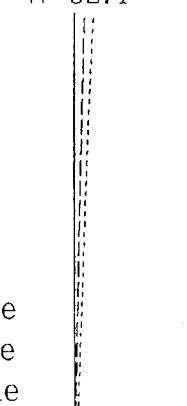
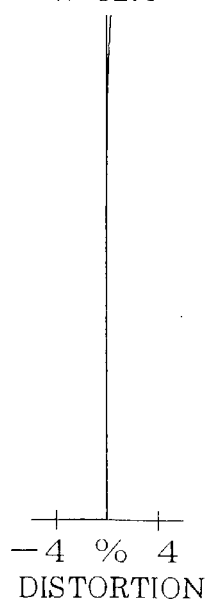
——— d line
- - - - - g line
- - - - - C line
— S
- - M
−0.5   0.5     −0.05   0.05     −0.5   0.5     −4 % 4
SPHERICAL     LATERAL     ASTIGMATISM     DISTORTION
ABERRATION     CHROMATIC
                ABERRATION
CHROMATIC
ABERRATION

WIDE-ANGLE ZOOM LENS SYSTEM

BACKGROUND OF THE INVENTION

1. Field of the Invention

The present invention relates to a wide-angle zoom lens system, for single lens reflex cameras, which has an angle-of-view (=2ω) of more than 90° at the short focal length extremity.

2. Description of the Related Art

In a single lens reflex camera, it is necessary to maintain a long back focal distance because a quick-return mirror is positioned behind the photographing lens system. For this reason, a retrofocus lens system having a negative lens element and a positive lens element, in this order from is the object, is generally employed for a wide-angle lens system. However, in a retrofocus lens system, it is extremely difficult to correct distortion and field curvature in the vicinity of the short focal length extremity while securing a long back focal distance and maintaining an overall length of the lens system shorter. For example, in a wide-angle zoom lens system in which a diaphragm S is positioned between the negative front lens group and the positive rear lens group, if, an attempt is made to effectively correct distortion and field curvature, there is only one of the following two ways:

(i) positioning the positive lens element in the negative front lens group more distant from the diaphragm S; and positioning the negative lens element in the positive rear lens group more distant from the diaphragm S; or (ii) providing the positive lens element and the negative lens element with stronger power.

However, in the former, the diameter of the front-most lens element in the front lens group has to be increased, and also the diameter of the rear-most lens element in the rear lens group has to be increased, and furthermore the entire length of the lens system has to be increased. On the other hand, in the latter, if the power of the positive lens element in the negative front lens group is increased, the power of other negative lens elements in the negative front lens group has to be increased at the same time. This causes an increase of aberration of higher-order. AS a result, the rate of change in distortion and filed curvature with respect to the change in the angle-of-view increases, in particular, in a range where the angle-of-view is larger; and coma of higher-order remains, so that maintaining optimum optical performance becomes difficult.

Due to the above-mentioned problems, in a zoom lens system, particularly, in a wide-angle zoom lens system in which the angle-of-view at the short focal length extremity is more than 90° for the purpose of miniaturization and in order to correct aberrations other than distortion and field curvature, these distortion and field curvature have to be allowed to remain to some extent.

SUMMARY OF TEE INVENTION

It is an object of the present invention to provide a zoom lens system, for single lens reflex cameras, which has a superwide angle-of-view of more than 90° at the short focal length extremity, and which is compact, and can suitably correct distortion and field curvature over the entire focal length range.

In order to achieve the above mentioned object, there is provided a wide-angle zoom lens system including a negative first lens group, a positive second lens group, a diaphragm, and a positive third lens group, in this order from the object; whereby upon zooming from the short focal length extremity towards the long focal length extremity, each lens group is arranged to move so that the space between the first and second lens groups and the space between the second and third lens groups are narrowed; and the diaphragm moves integrally with the third lens group. At least one negative lens element having a concave surface facing towards the image is provided in the first lens group, and the concave surface of the at least one negative lens element is an aspherical surface; and the wide-angle zoom lens system preferably satisfies the following condition:

$$0.8 < X1/fS < 2.0 \qquad (1)$$

wherein

X1 designates the distance, along the optical axis, between the aspherical surface in the first lens group and the diaphragm at the long focal length extremity; and fS designates the focal length of the entire lens system at the short focal length extremity.

The above explained aspherical surface in the wide-angle zoom lens system is preferably formed as an aspherical surface on which the radius of curvature becomes larger than that of the paraxial spherical surface along with an increase of the distance from the optical axis towards the periphery so that negative power is weakened, and the wide-angle zoom lens system preferably satisfies the following condition:

$$-0.1 < (\Delta x/fS) \cdot (N-1) < -0.01 \qquad (2)$$

wherein

Δx designates the amount of asphericity at the effective radius (the distance of 'fS×0.65' from the optical axis); and fS designates the focal length of the entire lens system at the short focal length extremity.

N designates the refractive index of the material forming the aspherical surface.

For the purpose of attaining both size and weight reduction, the negative front lens group preferably includes a negative lens element having a concave surface facing towards the image, another negative lens element having a concave surface facing towards the image, and a positive lens element, in this order from the object.

The positive third lens group preferably includes at least one aspherical surface, and the wide-angle zoom lens system preferably satisfies the following condition:

$$1.0 < X3/fS < 1.6 \qquad (3)$$

wherein

X3 designates the distance, along the optical axis, between the aspherical surface in the third lens group and the diaphragm; and fS designates the focal length of the entire lens system at the short focal length extremity.

In the third lens group, a lens surface on which the aspherical surface is formed is preferably a convex surface facing towards the image The aspherical surface in the third lens group is formed as an aspherical surface on which the radius of curvature becomes larger than that of the paraxial spherical surface along with an increase of the distance from the optical axis towards the periphery so that positive power is weakened, and the wide-angle zoom lens system preferably satisfies the following condition:

$$0.1 < (\Delta x/fS) \cdot (N-1) \cdot 1000 < 1.0 \qquad (4)$$

Δx designates the amount of asphericity at the effective radius (the distance of 'fS×0.39' from the optical axis); and fS designates the focal length of the entire lens system at the abort focal length extremity.

N designates the refractive index of the lens material forming the aspherical surface.

According to another aspect, there is provided a wide-angle zoom lens system including a negative lens group and a positive lens group, in this order from the object. The negative lens group includes a negative lens element, another negative lens element, and a positive lens element, in this order from the object. Furthermore, at least one of the two negative lens elements in the negative lens group has an aspherical surface, and the wide-angle zoom lens system has an angle-of-view of more than 90° at the short focal length extremity.

Since the negative lens group which is closest to the object is constituted by the negative lens element, the negative lens element, and the positive lens element, in this order from the object, the angle-of-view of more than 90° at the short focal length extremity can easily be attained. Moreover, the two negative lens elements are preferably formed as negative lens elements having concave surfaces facing towards the image, and in order to suitably correct aberrations, an aspherical surface is preferably formed on at least one of the concave surfaces.

The present disclosure relates to subject matter contained in Japanese Patent Application No. Hei-10-304416 (filed on Oct. 26, 1998) which is expressly incorporated herein by reference in its entirety.

BRIEF DESCRIPTION OF THE DRAWINGS

The invention will be discussed below in detail with reference to the accompanying drawings, in which:

FIG. 7 is the lens arrangement of the second embodiment of the zoom lens system at the long focal length extremity;

FIGS. 8A, 8B, 8C and 8D are aberration diagrams of the lens arrangement shown in FIG. 7;

FIG. 9 is a lens arrangement of a third embodiment of a zoom lens system at the short focal length extremity;

FIGS. 10A, 10B, 10C and 10D are aberration diagrams of the lens arrangement shown in FIG. 9;

FIG. 11 is the lens arrangement of the third embodiment of the zoom lens system at the long focal length extremity;

FIGS. 12A, 12B, 12C and 12D are aberration diagrams of the lens arrangement shown in FIG. 11;

FIG. 13 is a lens arrangement of a fourth embodiment of a zoom lens system at the short focal length extremity;

FIGS. 14A, 14B, 14C and 14D are aberration diagrams of the lens arrangement shown in FIG. 13;

FIG. 15 is the lens arrangement of the fourth embodiment of the zoom lens system at the long focal length extremity)

FIGS. 16A, 16B, 16C and 16D are aberration diagrams of the lens arrangement shown in FIG. 15;

FIG. 19 is the lens arrangement of the fifth embodiment of the zoom lens system at the long focal length extremity;

FIGS. 20A, 20B, 20C and 20D are aberration diagrams of the lens arrangement shown in FIG. 19;

FIG. 21 is a lens arrangement of a sixth embodiment of a zoom lens system at the short focal length extremity;

FIGS. 22A, 22D, 22C and 22D are aberration diagrams of the lens arrangement shown in FIG. 21;

FIG. 23 is the lens arrangement of the sixth embodiment of the zoom lens system at the long focal length extremity;

FIGS. 24A, 24B, 24C and 24D are aberration diagrams of the lens arrangement shown in FIG. 23.

DESCRIPTION OF THE PREFERRED EMBODIMENT

Figure 25:
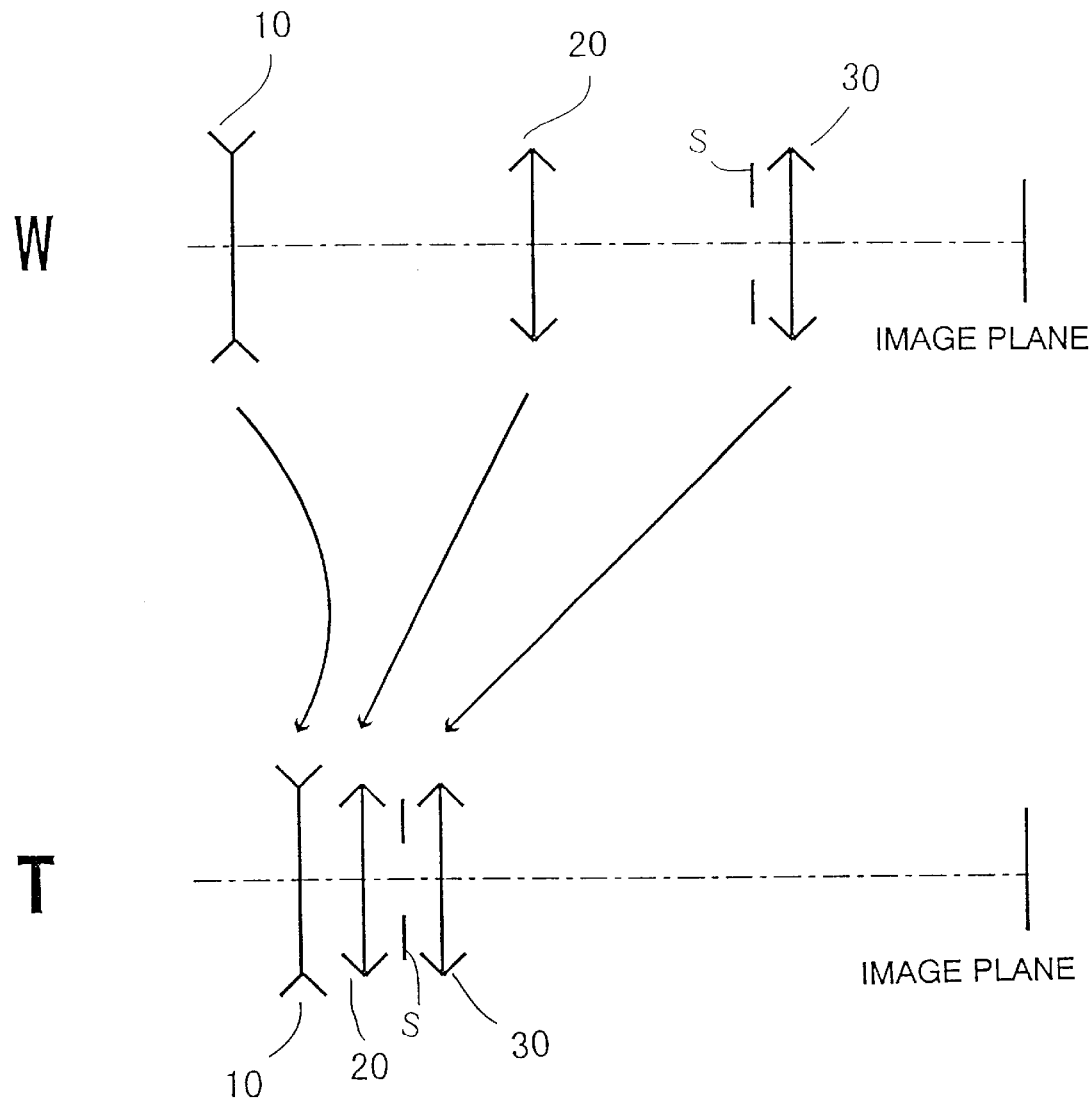
FIG. 25 is a diagram showing lens-group moving paths of a zoom lens system.

A wide-angle zoom lens system constituted by three lens groups, as shown in the lens-group moving paths in FIG. 25, includes a negative first lens group 10, a positive second lens group 20, and a positive third lens group 30, in this order from the object. Upon zooming from the short focal length extremity towards the long focal length extremity, the first lens group 10 moves towards the image and changes the moving direction towards the object in the vicinity of the long focal length extremity, and the second lens group 20 and the third lens group 30 move towards the object, while the space between the first lens group 10 and the second lens group 20 and the space between the second lens group 20 and the third lens group 30 are narrowed. A diaphragm 6 is positioned between the second lens group 20 and the third lens group 30, and moves integrally with the third lens group 30.

In the above explained three-lens-group wide-angle zoom lens system constituted by the negative lens group, the positive lens group and the positive lens group, distortion and field curvature can be corrected by appropriately employing an aspherical surface; the number of lens elements can be reduced; an increase of the diameter of the front-most lens element in the front lens group can be prevented, and an increase of the entire length of the lens system can be prevented. In particular, distortion occurred in the negative direction can be corrected by an aspherical surface formed on at least one concave surface, facing towards the image, of at least one negative lens element in the negative first lens group 10 which is distant from the diaphragm S, and furthermore, the aspherical surface is arranged to correct distortion through the weakening of power at the periphery. Accordingly, it should be noted that the position of an aspherical surface (i.e., the distance from the diaphragm) and the shape of the aspherical surface are important factors. Conditions (1) and (2) respectively specify these factors.

Condition (1) specifies the position of an aspherical surface to be formed on a lens element in the first lens group 10. On a lens surface distant from the diaphragm S, light rays pass therethrough with different heights, each of which depends on an angle-of-view. When an aspherical surface is formed at a position distant from the diaphragm S so that condition (1) is satisfied, predetermined shapes, each of which is independent, and is determined according to each angle-of-view, can be obtained. Due to this arrangement for the aspherical surface, not only spherical aberration in the vicinity of the long focal length extremity, but also distortion and field curvature in the vicinity of the short focal length extremity can effectively be corrected.

If X1/fS exceeds the upper limit of condition (1), the correcting of spherical aberration at the long focal length extremity becomes difficult. If X1/fS exceeds the lower limit of condition (1), it becomes difficult to independently correct spherical aberration at the long focal length extremity and off-axis aberrations at the short focal length extremity.

Condition (2) specifies the shape of the aspherical surface formed on the lens element in the first lens group 10. By satisfying this condition, negative power is weakened on the aspherical surface according to an increase of the distance from the optical axis towards the periphery.

In the wide-angle lens system, in order to correct distortion occurred in the negative direction, it is effective to weaken power at the periphery of a negative lens element in the first lens group 10. For this purpose, it is possible to utilize either one of the following options:

(A) forming an aspherical surface on a lens surface, in the first lens group 10, facing towards the object; and the amount of asphericity is made positive; and (B) forming an aspherical surface on a lens surface, in the first lens group 10, facing towards the image; and the amount of asphericity is made negative.

However, in the option (A), since the curvature of the aspherical surface is made larger (a smaller radius of curvature), aberrations increase. This means that the correcting of aberrations is performed through the above increased aberrations, and thereby the load, with respect to the correcting of aberrations, imposed on other lens surfaces behind the aspherical surface increases. Conversely, in the option (B), since the curvature of the aspherical surface is smaller (a larger radius of curvature), aberrations decrease. This means that the correcting of aberrations is performed by mutually canceling aberrations, and thereby the load, with respect to the correcting of aberrations, imposed on other lens surfaces behind the aspherical surface decreases. The correcting of distortion occurred in the negative direction is then performed through the option (B).

If $(\Delta x/fS) \cdot (N-1)$ exceeds the upper limit of condition (2), the amount of asphericity is small, and the correcting of distortion in the vicinity of the short focal length extremity is insufficient. If $(\Delta x/fS) \cdot (N-1)$ exceeds the lower limit of condition (2), the amount of asphericity is large, and spherical aberration in the vicinity of the long focal length extremity becomes undercorrected. Moreover, manufacturing of the lens element becomes difficult.

In the embodiments, the focal length (fS) at the short focal length extremity multiplied by 0.65 is defined as the effective radius in condition (2).

By employing the above described aspherical surface in the first lens group 10, a positive lens element with weaker power, which is generally used in a wide-angle lens system for correcting distortion, can be eliminated, so that the first lens group 10 can be constituted by a three-lens-group lens system, i.e., the negative lens element, the negative lens element and the positive lens element, in this order from the object.

Conditions (3) and (4) specify the position and shape of an aspherical surface employed in the third lens group 30. Condition (3) specifies the position of the aspherical surface. By employing the aspherical surface in the third lens group 30, the number of positive lens elements therein can be reduced. Furthermore, by satisfying condition (3), the distance from the diaphragm S to the aspherical surface can be maintained by a certain extent. Therefore not only spherical aberration in the vicinity of the long focal length extremity, but also coma and astigmatism can effectively be corrected over the entire focal length range.

If the distance between the diaphragm S and the aspherical surface is made large to the extent that X3/fS exceeds the upper limit of condition (3), it becomes difficult to maintain the back focal distance. On the other hand, if the distance between the diaphragm S and the aspherical surface is made shorter to the extent that X3/fS exceeds the lower limit of condition (3), spherical aberration in the vicinity of the long focal length extremity can be corrected; however, coma and astigmatism cannot be corrected effectively over the entire focal length range.

Condition (4) specifies the shape of the aspherical surface of the aspherical lens element in the third lens group 30. By satisfying this condition, positive power is weakened on the aspherical surface along with an increase of the distance from the optical axis towards the periphery. Furthermore, the aspherical surface in the third lens group 30 is preferably formed on a convex surface facing towards the image. More concretely, when the convex surface facing towards the image is formed as an aspherical surface on which positive power is weakened along with an increase of the distance from the optical axis towards the periphery, Seidel's coefficients, S1, S2 and S3 become positive, which is advantageous to correct aberrations. In the above Seidel's coefficients, it is understood that S1 designates the spherical aberration coefficient, S2 designates the coma coefficient, and S3 designates the astigmatism coefficient.

If $(\Delta x/fS) \cdot (N-1) \cdot 1000$ exceeds the upper limit of condition (4), the amount of asphericity increases, and spherical aberration at a long focal length becomes under corrected. Moreover, manufacturing of the aspherical lens element becomes difficult. If $(\Delta x/fS) \cdot (N-1) \cdot 1000$ exceeds the lower limit of condition (4), the amount of asphericity decreases, and the correcting of distortion at the short focal length extremity is insufficient.

In the embodiments, the focal length (fS) at the short focal length extremity multiplied by 0.39 is defined as the effective radius in condition (4).

Specific numerical data of the embodiments will be described hereinafter. In the diagrams of chromatic aberration represented by spherical aberration. (axial chromatic aberration), the solid lines and the two types of dotted lines respectively indicate spherical aberrations with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables of the following embodiments, $F_{NO}$ designates the F-number, f designates the focal length of the entire lens system, w designates the half angle-of-view, $f_S$ designates the back focal distance, R designates the radius of curvature of each lens surface, D designates the lens thickness or the distance between the lens elements, $N_d$ designates the refractive index at the d-line, and v designates the Abbe number. A value of 'D' at the position of the diaphragm designates the distance from the diaphragm S to the most-object side surface of the third lens group.

In addition to the above, an aspherical surface which is symmetrical with respect to the optical axis is defined as follows:

$$x = Ch^2/\{1+[-(1+K)C^2h^2]^{1/2}\} + A4h^4 + A6h^6 + A8h^8 + A10h^{10} \ldots ;$$

wherein:

x designates a distance from a tangent plane of an aspherical vertex;

C designates a curvature of the aspherical vertex (1/R);

h designates a distance from the optical axis;

K designates the conic coefficient; and

A4 designates a fourth-order aspherical coefficient;

A6 designates a sixth-order aspherical coefficient;

A8 designates a eighth-order aspherical coefficient;

Embodiment 1

Figure 1:
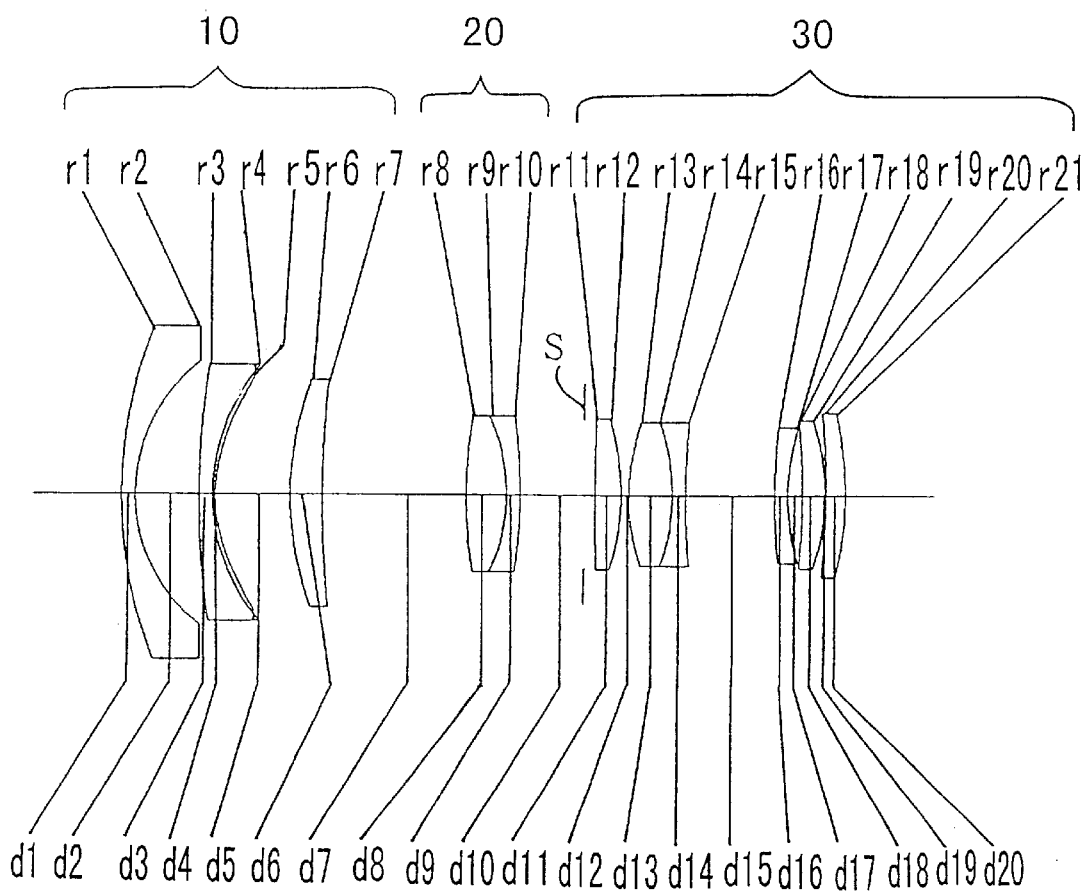
FIG. 1 is a lens arrangement of a first embodiment of a zoom lens system at the short focal length extremity.
Figure 2:
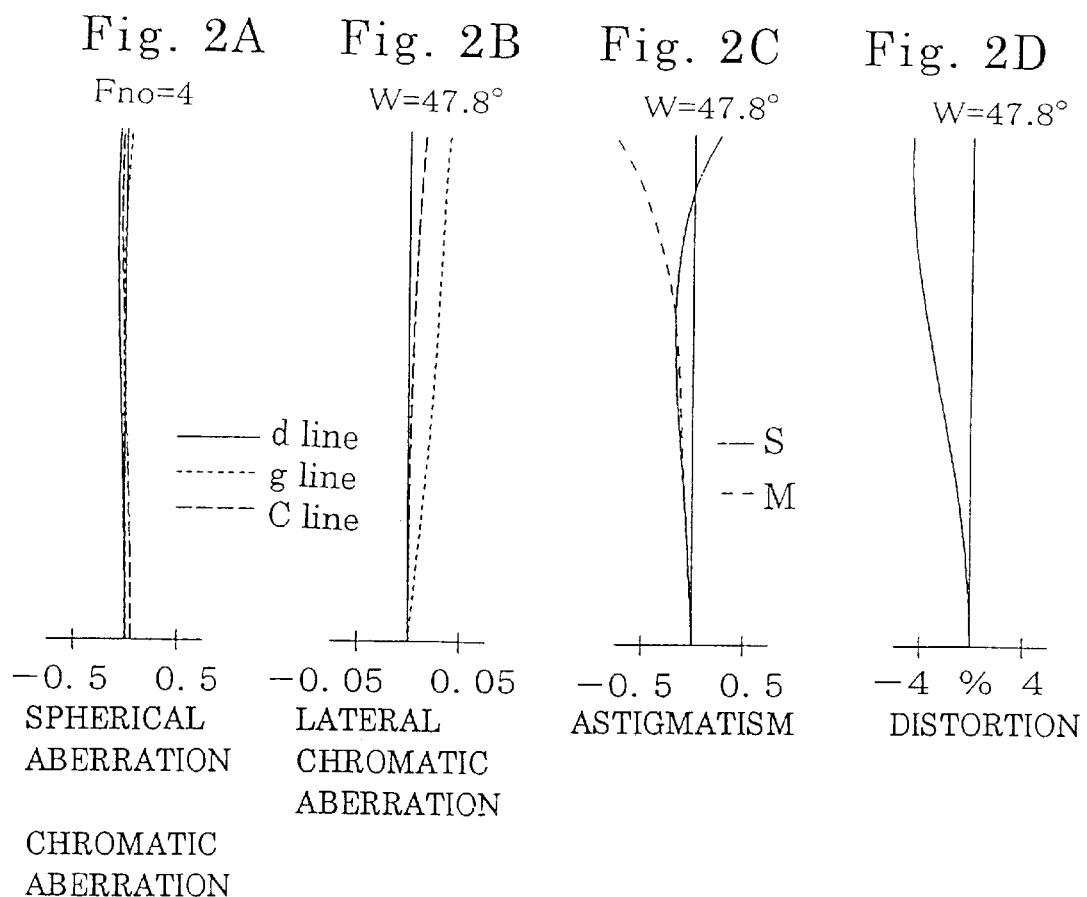
FIGS. 2A, 2B, 2C and 2D are aberration diagrams of the lens arrangement shown in FIG. 1.
Figure 3:
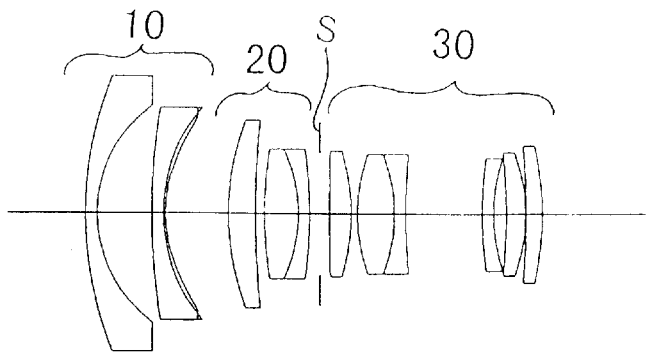
FIG. 3 is the lens arrangement of the first embodiment of the zoom lens system at the long focal length extremity.
Figure 4A:
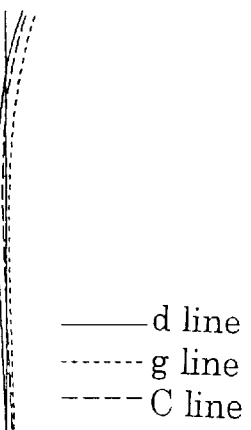
FIGS. 4A, 4B, 4C and 4D are aberration diagrams of the lens arrangement shown in FIG. 3.
Figure 4B:
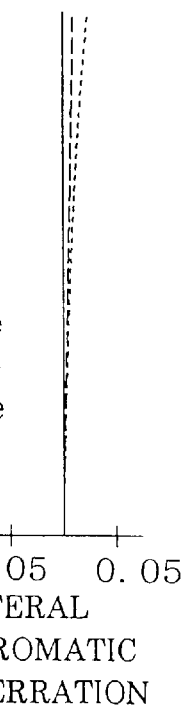
Figure 4C:
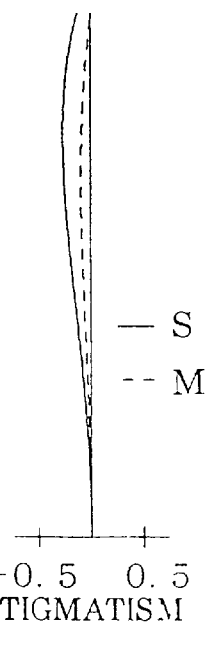
Figure 4D:
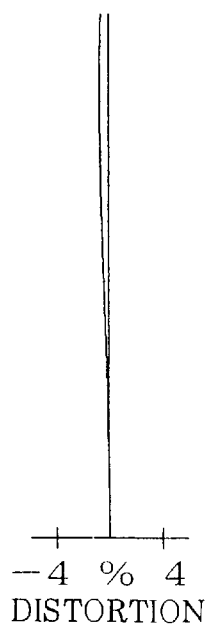

FIGS. 1 and 3 respectively show the lens arrangements of a first embodiment of a zoom lens system at the short focal length extremity and the long focal length extremity. FIGS. 2A, 2B, 2C, 2D, and 4A, 4B, 4C, 4D are aberration diagrams of the lens arrangements shown in FIGS. 1 and 3. Table 1 shows the numerical data thereof. Surface Nos. 1 through 7 are the negative first lens group 10, surface Nos. 8 through 10 are the positive second lens group 20, and surface Nos. 11 through 21 are the positive third lens group 30. The first lens group 10 includes a negative lens element, a hybrid lens element whose image-side surface is formed as an aspherical surface, and a positive lens element, in this order from the object. The second lens group 20 includes a cemented sub-lens group having a positive lens element and a negative lens element. The third lens group 30 includes a positive lens element, a cemented sub-lens group having a positive lens element and a negative lens element, a negative lens element, a positive lens element and a positive lens element, in this order from the object.

TABLE 1

$F_{NO} = 1:4–4$
f = 20.60–34.00 (Zoom Ratio: 1.65)
W = 47.8–32.6
$f_B$ = 36.90–53.66

| Surface No. | R | D | Nd | ν |
|---|---|---|---|---|
| 1 | 50.915 | 1.500 | 1.78590 | 44.2 |
| 2 | 18.677 | 7.201 | — | — |
| 3 | 95.348 | 1.500 | 1.80400 | 46.6 |
| 4 | 22.551 | 0.280 | 1.53256 | 45.9 |
| 5 | 18.000 | 8.314 | — | — |
| 6 | 37.544 | 3.520 | 1.84666 | 23.8 |
| 7 | 127.898 | 16.008–1.200 | — | — |
| 8 | 53.582 | 4.468 | 1.51742 | 52.4 |
| 9 | −21.269 | 1.500 | 1.80400 | 46.6 |
| 10 | −63.353 | 7.196–1.400 | — | — |
| Diaphragm | ∞ | 1.288 | — | — |
| 11 | 321.162 | 2.877 | 1.60285 | 43.5 |
| 12 | −29.502 | 0.861 | — | — |
| 13 | 24.960 | 4.828 | 1.48749 | 70.2 |
| 14 | −23.877 | 1.500 | 1.83400 | 37.2 |
| 15 | 90.211 | 10.070 | — | — |
| 16 | 63.256 | 1.500 | 1.84666 | 23.8 |
| 17 | 25.491 | 1.671 | — | — |
| 18 | −81.972 | 2.558 | 1.58913 | 61.2 |
| 19 | −25.305 | 0.100 | — | — |
| 20 | −94.077 | 2.187 | 1.58913 | 61.2 |
| 21 | −39.658 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9829 × 10$^{-5}$ | −0.2078 × 10$^{-7}$ | −0.4786 × 10$^{-10}$ |

Embodiment 2

Figure 5:
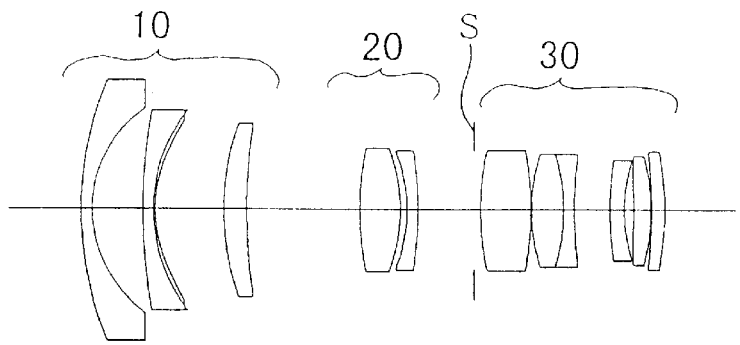
FIG. 5 is a lens arrangement of a second embodiment of a zoom lens system at the short focal length extremity.
Figure 6A:
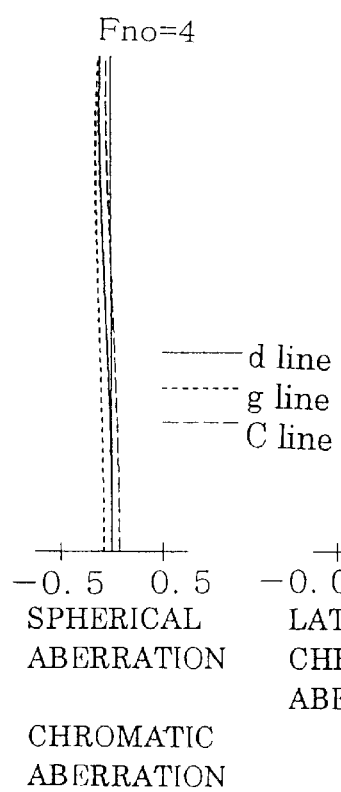
FIGS. 6A, 6B, 6C and 6D are aberration diagrams of the lens arrangement shown in FIG. 5.
Figure 6B:
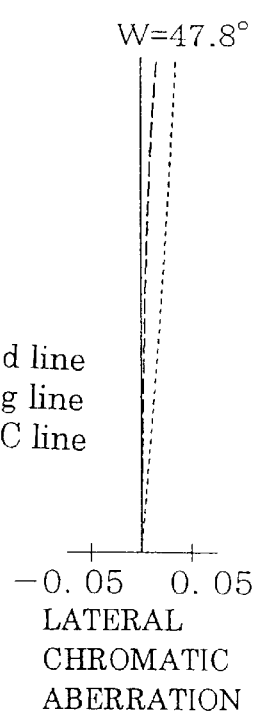
Figure 6C:
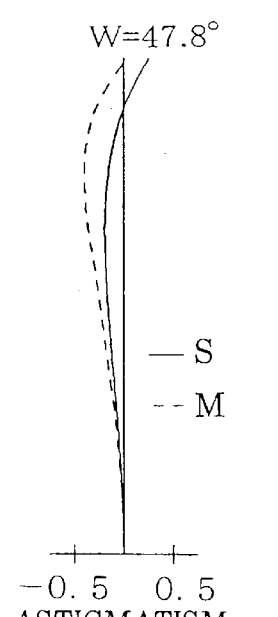
Figure 6D:
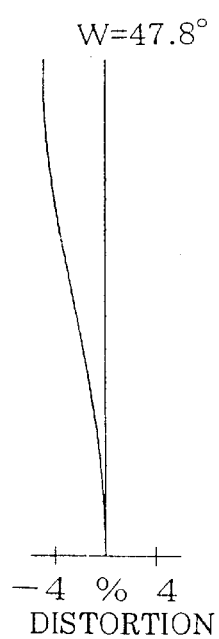

FIGS. 5 and 7 respectively show the lens arrangements of a second embodiment of a zoom lens system at the short focal length extremity and the long focal length extremity. FIGS. 6A, 6B, 6C, 6D, and 8A, 8B, 8C, 8D are aberration diagrams of the lens arrangements shown in FIGS. 5 and 7. Table 2 shows the numerical data thereof. Surface Nos. 1 through 7 are the negative first lens group 10, surface Nos. 8 through 11 are the positive second lens group 20, and surface Nos. 12 through 22 are the positive third lens group 30. The first lens group 10 includes a negative lens element, a hybrid lens element whose image-side surface is formed as an aspherical surface, and a positive lens element, in this order from the object. The second lens group 20 includes a positive lens element and a negative lens element, in this order from the object. The third lens group 30 includes a positive lens element, a cemented sub-lens group having a positive lens element and a negative lens element, a negative lens element, a positive lens element and a positive lens element, in this order from the object.

TABLE 2

$F_{NO} = 1:4–4$
f = 20.60–34.00 (Zoom Ratio: 1.65)
W = 47.8–32.8
$f_B$ = 36.90–54.06

| Surface No. | R | D | Nd | ν |
|---|---|---|---|---|
| 1 | 49.958 | 1.500 | 1.77250 | 49.6 |
| 2 | 18.055 | 7.133 | — | — |
| 3 | 77.021 | 1.500 | 1.80400 | 46.6 |
| 4 | 23.434 | 0.280 | 1.53256 | 45.9 |
| 5* | 18.523 | 9.645 | — | — |
| 6 | 37.751 | 3.237 | 1.84666 | 23.8 |
| 7 | 85.635 | 15.704–1.200 | — | — |
| 8 | 44.844 | 5.556 | 1.51742 | 52.4 |
| 9 | −24.795 | 0.912 | — | — |
| 10 | −23.374 | 1.500 | 1.80610 | 40.9 |
| 11 | −57.231 | 7.823–2.892 | — | — |
| Diaphragm | ∞ | 0.900 | — | — |
| 12 | 40.468 | 7.000 | 1.57099 | 50.8 |
| 13 | −47.043 | 0.100 | — | — |
| 14 | 26.971 | 4.522 | 1.48749 | 70.2 |
| 15 | −26.971 | 1.500 | 1.83481 | 42.7 |
| 16 | 52.869 | 5.053 | — | — |
| 17 | 58.927 | 2.000 | 1.84666 | 23.8 |
| 18 | 23.385 | 1.307 | — | — |
| 19 | −377.425 | 2.467 | 1.65160 | 58.5 |
| 20 | −29.833 | 0.100 | — | — |
| 21 | −66.632 | 1.868 | 1.65160 | 58.5 |
| 22 | −42.526 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9128 × 10$^{-5}$ | −0.2723 × 10$^{-7}$ | −0.1768 × 10$^{-10}$ |

Embodiment 3

FIGS. 9 and 11 respectively show the lens arrangements of a third embodiment of a zoom lens system at the short focal length extremity and the long focal length extremity. FIGS. 10A, 10B, 10c, 10D, and 12A, 12B, 12C, 12D are aberration diagrams of the lens arrangements shown in FIGS. 9 and 11. Table 3 shows the numerical data thereof. Surface Nos. 1 through 7 are the negative first lens group 10, surface Nos. 8 through 10 are the positive second lens group 20, and surface Nos. 11 through 19 are the positive third lens group 30. The first lens group 10 includes a negative lens element, a hybrid lens element whose image-side surface is formed as an aspherical surface, and a positive lens element, in this order from the object. The second lens group 20 includes a cemented sub-lens group having a positive lens element and a negative lens element. The third lens group 30 includes a positive lens element, a cemented sub-lens group having a positive lens element and a negative lens element, a negative lens element, a positive lens element, in this order from the object.

TABLE 3

$F_{NO} = 1:4\text{--}4$
$f = 20.60\text{--}34.00$ (Zoom Ratio: 1.65)
$W = 47.8\text{--}32.6$
$f_B = 37.92\text{--}54.88$

| Surface No. | R | D | Nd | ν |
|---|---|---|---|---|
| 1 | 52.836 | 1.500 | 1.77250 | 49.6 |
| 2 | 18.615 | 7.023 | — | — |
| 3 | 78.317 | 1.500 | 1.80400 | 46.6 |
| 4 | 22.563 | 0.280 | 1.53256 | 45.9 |
| 5* | 18.000 | 9.124 | — | — |
| 6 | 36.637 | 3.542 | 1.84666 | 23.8 |
| 7 | 85.443 | 13.769–1.214 | — | — |
| 8 | 57.322 | 3.941 | 1.51742 | 52.4 |
| 9 | −22.964 | 1.500 | 1.80400 | 46.6 |
| 10 | −63.439 | 9.115–1.400 | — | — |
| Diaphragm | ∞ | 1.652 | — | — |
| 11 | 775.294 | 2.795 | 1.60323 | 42.3 |
| 12 | −31.022 | 0.300 | — | — |
| 13 | 26.810 | 4.705 | 1.48749 | 70.2 |
| 14 | −24.770 | 1.500 | 1.83400 | 37.2 |
| 15 | 202.919 | 11.111 | — | — |
| 16 | 52.016 | 1.500 | 1.84666 | 23.8 |
| 17 | 23.807 | 1.570 | — | — |
| 18 | −245.653 | 3.283 | 1.58913 | 61.2 |
| 19* | −23.366 | — | — | — |

*designates the aspherical surface which is rotationally symmetrical with respect to the opitcal axis.

Aspherical surface data (the aspherical surface coefficients not indicated are zero (0.00)):

| Surface No. | K | A4 | A6 | A8 |
|---|---|---|---|---|
| 5 | −1.00 | −0.9901 × 10⁻⁵ | −0.1641 × 10⁻⁷ | −0.6366 × 10⁻¹⁰ |
| 19 | 0.00 | 0.3449 × 10⁻⁵ | 0.2773 × 10⁻⁸ | −0.1103 × 10⁻⁹ |

Embodiment 4

FIGS. 13 and 15 respectively show the lens arrangements of a fourth embodiment of a zoom lens system at the short focal length extremity and the long focal length extremity. FIGS. 14A, 14B, 14C, 14D, and 16A, 16B, 16C, 16D are aberration diagrams of the lens arrangements shown in FIGS. 13 and 15. Table 4 shows the numerical data thereof. The lens arrangement of this embodiment is substantially the same as that of the first embodiment.

TABLE 4

$F_{NO} = 1:4\text{--}4$
$f = 20.60\text{--}34.00$ (Zoom Ratio: 1.65)
$W = 47.8\text{--}32.7$
$f_B = 36.90\text{--}53.81$

| Surface No. | R | D | Nd | ν |
|---|---|---|---|---|
| 1 | 49.801 | 1.500 | 1.77250 | 49.6 |
| 2 | 18.154 | 7.124 | — | — |
| 3 | 78.507 | 1.500 | 1.80400 | 46.6 |
| 4 | 22.601 | 0.280 | 1.53256 | 45.9 |
| 5* | 18.000 | 8.542 | — | — |
| 6 | 35.566 | 3.141 | 1.84666 | 23.8 |
| 7 | 85.560 | 14.062–1.200 | — | — |
| 8 | 55.294 | 4.011 | 1.51742 | 52.4 |
| 9 | −21.335 | 1.500 | 1.80400 | 46.6 |
| 10 | −64.253 | 8.363–1.400 | — | — |
| Diaphragm | ∞ | 1.612 | — | — |
| 11 | 407.250 | 2.868 | 1.60323 | 42.3 |
| 12 | −29.307 | 0.434 | — | — |
| 13 | 25.320 | 4.663 | 1.48749 | 70.2 |
| 14 | −24.578 | 1.500 | 1.83400 | 37.2 |
| 15 | 120.988 | 10.768 | — | — |
| 16 | 59.183 | 1.500 | 1.84666 | 23.8 |
| 17 | 24.867 | 1.700 | — | — |
| 18 | −91.377 | 2.579 | 1.58913 | 61.2 |
| 19 | −25.913 | 0.100 | — | — |
| 20 | −125.617 | 2.112 | 1.58913 | 61.2 |
| 21 | −47.568 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | −1.00 | −0.9379 × 10⁻⁵ | −0.2702 × 10⁻⁷ | −0.5875 × 10⁻¹⁰ |

Embodiment 5

Figure 17:
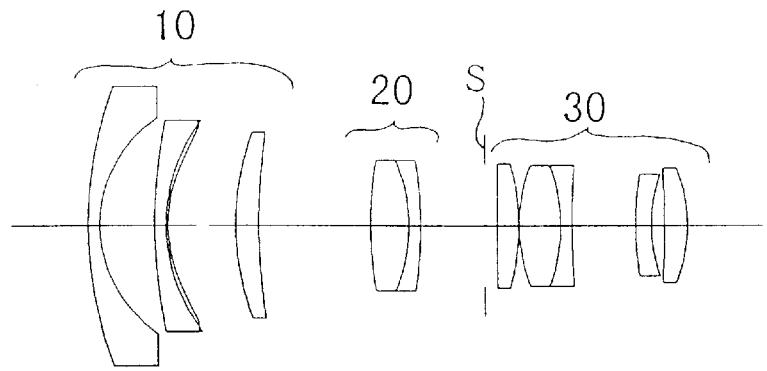
FIG. 17 is a lens arrangement of a fifth embodiment of a zoom lens system at the short focal length extremity.
Figure 18A:
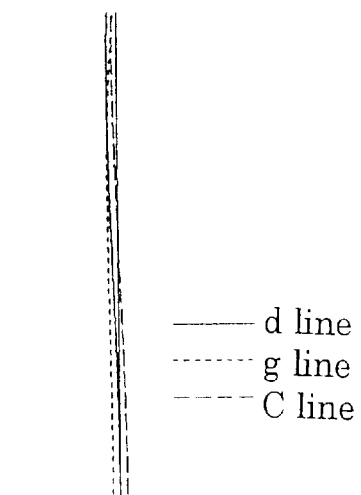
FIGS. 18A, 18B, 18C and 18D are aberration diagrams of the lens arrangement shown in FIG. 17.
Figure 18B:
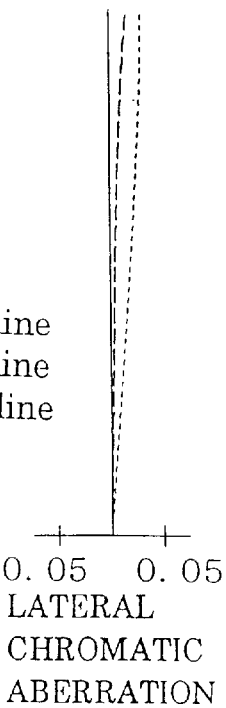
Figure 18C:
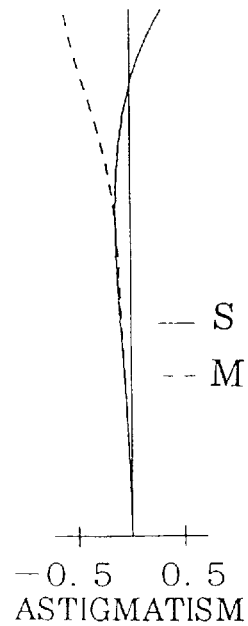
Figure 18D:
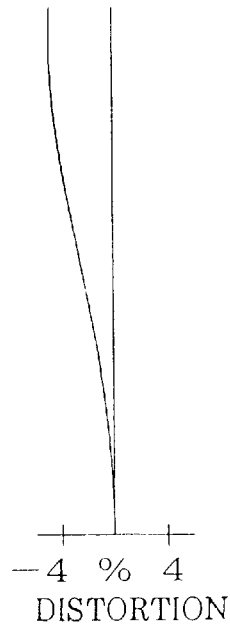

FIGS. 17 and 19 respectively show the lens arrangements of a fifth embodiment of a zoom lens system at the short focal length extremity and the long focal length extremity. FIGS. 18A, 18B, 18C, 18D, and 20A, 20B, 20C, 20D are aberration diagrams of the lens arrangements shown in FIGS. 17 and 19. Table 5 shows the numerical data thereof. The lens arrangement of this embodiment is substantially the same as that of the third embodiment.

TABLE 5

$F_{NO} = 1:4\text{--}4$
$f = 20.60\text{--}34.01$ (Zoom Ratio: 1.65)
$W = 47.8\text{--}32.6$
$f_B = 36.91\text{--}53.15$

| Surface No. | R | D | Nd | ν |
|---|---|---|---|---|
| 1 | 54.900 | 1.500 | 1.77250 | 49.6 |
| 2 | 17.929 | 7.300 | — | — |
| 3 | 71.700 | 1.500 | 1.80400 | 46.6 |
| 4 | 24.600 | 0.280 | 1.53256 | 45.9 |
| 5* | 19.581 | 8.930 | — | — |
| 6 | 37.350 | 3.050 | 1.84666 | 23.8 |
| 7 | 84.318 | 14.651–1.200 | — | — |
| 8 | 56.405 | 5.000 | 1.51742 | 52.4 |
| 9 | −23.707 | 1.500 | 1.80400 | 46.6 |
| 10 | −59.155 | 8.485–1.400 | — | — |
| Diaphragm | ∞ | 1.700 | — | — |
| 11 | ∞ | 2.730 | 1.61772 | 49.8 |
| 12 | −33.209 | 0.100 | — | — |

TABLE 5-continued $F_{NO} = 1:4-4$
f = 20.60–34.01 (Zoom Ratio: 1.65)
W = 47.8–32.6
$f_B$ = 36.91–53.15

| Surface No. | R | D | Nd | ν |
|---|---|---|---|---|
| 13 | 24.406 | 5.400 | 1.48749 | 70.2 |
| 14 | -24.406 | 1.500 | 1.80610 | 40.9 |
| 15 | 135.000 | 8.380 | — | — |
| 16 | 46.238 | 2.080 | 1.84666 | 23.8 |
| 17 | 21.500 | 1.730 | — | — |
| 18 | -139.000 | 3.000 | 1.58913 | 61.2 |
| 19* | -22.003 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 5 | -1.00 | $-0.9670 \times 10^{-5}$ | $-0.1870 \times 10^{-7}$ | $-0.8470 \times 10^{-10}$ |
| 19 | 0.00 | $0.2530 \times 10^{-5}$ | $-0.6230 \times 10^{-8}$ | $-0.2970 \times 10^{-9}$ |

Embodiment 6

FIGS. 21 and 23 respectively show the lens arrangements of a sixth embodiment of a zoom lens system at the short focal length extremity and the long focal length extremity. FIGS. 22A, 22B, 22C, 22D, and 24A, 24B, 24C, 24D are aberration diagrams of the lens arrangements shown in FIGS. 21 and 23. Table 6 shows the numerical data thereof. Surface Nos. 1 through 6 are the negative first lens group 10, surface Nos. 7 through 9 are the positive second lens group 20, and surface Nos. 10 through 18 are the positive third lens group 30. The first lens group 10 includes a negative lens element, a negative lens element, and a positive lens element, in this order from the object. The second lens group.20 includes a cemented sub-lens group having a positive lens element and a negative lens element. The third lens group 30 includes a positive lens element, a cemented sub-lens group having a positive lens element and a negative lens element, a negative lens element, a positive lens element, in this order from the object.

TABLE 6

$F_{NO} = 1:4-4$
f = 20.60–34.00 (Zoom Ratio: 1.65)
W = 47.6–32.4
$f_B$ = 37.00–53.30

| Surface No. | R | D | Nd | ν |
|---|---|---|---|---|
| 1 | 73.206 | 1.500 | 1.77250 | 49.6 |
| 2* | 16.443 | 7.887 | — | — |
| 3 | 85.215 | 1.500 | 1.80400 | 46.6 |
| 4 | 27.101 | 6.662 | — | — |
| 5 | 32.995 | 4.789 | 1.84666 | 23.8 |
| 6 | 74.700 | 16.026–2.243 | — | — |
| 7 | 58.537 | 4.475 | 1.51742 | 52.4 |
| 8 | -24.656 | 1.500 | 1.80400 | 46.6 |
| 9 | -72.058 | 8.519–1.400 | — | — |
| Diaphragm | ∞ | 1.800 | — | — |
| 10 | -364.978 | 2.647 | 1.60729 | 49.2 |
| 11 | -32.717 | 0.100 | — | — |
| 12 | 26.390 | 4.928 | 1.48749 | 70.2 |
| 13 | -26.390 | 1.500 | 1.83400 | 37.2 |
| 14 | -560.543 | 9.647 | — | — |

TABLE 6-continued $F_{NO} = 1:4-4$
f = 20.60–34.00 (Zoom Ratio: 1.65)
W = 47.6–32.4
$f_B$ = 37.00–53.30

| Surface No. | R | D | Nd | ν |
|---|---|---|---|---|
| 15 | 41.983 | 1.500 | 1.84666 | 23.8 |
| 16 | 21.986 | 3.089 | — | — |
| 17 | -89.046 | 3.300 | 1.58913 | 61.2 |
| 18* | -23.799 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 2 | -0.74 | $0.5285 \times 10^{-5}$ | $0.8655 \times 10^{-8}$ | $0.6283 \times 10^{-11}$ |
| 18 | 0.00 | $0.6784 \times 10^{-5}$ | $0.1280 \times 10^{-7}$ | $-0.5151 \times 10^{-10}$ |

Table 7 shows the values of each condition for each embodiment.

TABLE 7

| | Cond. (1) | Cond. (2) | Cond. (3) | Cond. (4) |
|---|---|---|---|---|
| Embodiment 1 | 0.99 | -0.038 | — | — |
| Embodiment 2 | 1.21 | -0.035 | — | — |
| Embodiment 3 | 1.01 | -0.038 | 1.38 | 0.38 |
| Embodiment 4 | 0.96 | -0.039 | — | — |
| Embodiment 5 | 1.02 | -0.032 | 1.29 | 0.13 |
| Embodiment 6 | 1.48 | -0.036 | 1.39 | 0.88 |

As can be understood from the above table, each embodiment satisfies each condition, and various aberrations including distortion are relatively well corrected. Field curvature is indicated by astigmatism.

According to the above descriptions, a wide-angle zoom lens system, which has an angle-of-view of more than 90° at the short focal length extremity, and which is compact, and can adequately correct distortion and filed curvature over the entire focal length range, can be obtained.

What is claimed is:

1. A wide-angle zoom lens system comprising a negative first lens group, a positive second lens group, a diaphragm, and a positive third lens group, in this order from an object;

wherein upon zooming from the short focal length extremity towards the long focal length extremity, each lens group is arranged to move so that the space between said first and second lens groups and the space between said second and third lens groups are narrowed, and said diaphragm moves integrally with said third lens group;

wherein at least one negative lens element having a concave surface facing towards an image is provided in said first lens group, and said concave surface is an aspherical surface; and wherein said wide-angle zoom lens system satisfies the following condition;

$$0.8 < X1/fS < 2.0$$

wherein

X1 designates the distance, along the optical axis, between said aspherical surface in said first lens group and said diaphragm at the long focal length extremity; and fS designates the focal length of the entire lens system at the short focal length extremity.

2. The wide-angle zoom lens system according to claim 1, wherein the radius of curvature of said aspherical surface becomes larger than that of a paraxial spherical surface along with an increase of the distance from the optical axis towards the periphery so that negative power is weakened, and wherein said wide-angle zoom lens system satisfies the following condition:

$$-0.1 < (\Delta x / fS) \cdot (N-1) < -0.01$$

wherein $\Delta x$ designates the amount of asphericity at an effective radius; and N designates the refractive index of the material forming said aspherical surface.

3. The wide-angle zoom lens system according to claim 1, wherein said negative first lens group comprises a negative lens element having a concave surface facing towards said image, a negative lens element having a concave surface facing towards said image, and a positive lens element, in this order from said object.

4. The wide-angle zoom lens system according to claim 1, wherein said positive third lens group includes a lens element having at least one aspherical surface, and wherein said wide-angle zoom lens system satisfies the following condition:

$$1.0 < X3/fS < 1.6$$

wherein

X3 designates the distance, along the optical axis, between said aspherical surface in said third lens group and said diaphragm; and fS designates the focal length of the entire lens system at the short focal length extremity.

5. The wide-angle zoom lens system according to claim 4, wherein said aspherical surface is a convex surface facing towards said image.

6. The wide-angle zoom lens system according to claim 5, wherein the radius of curvature of said aspherical surface becomes larger than that of a paraxial spherical surface along with an increase of the distance from the optical axis towards the periphery so that positive power is weakened; and wherein said wide-angle zoom lens system satisfies the following condition:

$$0.1 < (\Delta X/fS) \cdot (N-1) \cdot 1000 < 1.00$$

7. A wide-angle zoom lens system consisting of three lens groups including a negative lens group and a positive lens group, in this order from an object;

wherein upon zooming from a short focal length extremity towards a long focal length extremity, each of said negative and positive lens groups move so that a space between said lens groups is reduced, and each lens of each of the said three lens groups moves integrally together with a respective one of said three lens groups during a zooming operation;

wherein said negative lens group comprises a negative lens element, a negative lens element, and a positive lens element, in this order from the object;

wherein at least one of said two negative lens elements in said negative lens group has an aspherical surface, and wherein said wide-angle zoom lens system has an angle-of-view of more than 90° at the short focal length extremity.

8. The wide-angle zoom lens system according to claim 7, wherein said negative lens elements are formed as negative lens elements having concave surfaces facing towards said image, and wherein at least one of said concave surfaces is formed as an aspherical surface.

9. The wide-angle zoom lens system according to claim 7, said system further comprising a diaphragm integrally moveable with a lens group closest to the image.

10. The wide-angle zoom lens system according to claim 7, wherein at least one negative lens element of said negative lens group having a concave aspherical surface faces towards an image, said wide-angle zoom lens system further comprising a diaphragm and satisfying the following relationship:

$$0.8 < X1/fS < 2.0$$

wherein

X1 represents a distance along the optical axis between said aspherical surface and said diaphragm at the long focal length extremity; and fS represents the focal length of the entire lens system at the short focal length extremity.

11. A wide-angle zoom lens system comprising a negative lens group and a positive lens group, in this order from an object;

said negative lens group comprising a negative lens element, a negative lens element, and a positive lens element in this order from the object;

at least one of said two negative lens elements in said negative lens group having an aspherical surface, said negative lens elements having concave surfaces facing towards an image, at least one of said concave surfaces comprising said aspherical surface; and said wide-angle zoom lens system having an angle-of-view of more than 90° at the short focal length extremity.

12. The wide-angle zoom lens system according to claim 11, said zoom lens system consisting of three lens groups which move relative to each other for zooming, the lenses of each lens group moving integrally during zooming.

* * * * *